(12) United States Patent
Chen

(10) Patent No.: US 12,469,528 B2
(45) Date of Patent: Nov. 11, 2025

(54) MEMORY DEVICE AND WRAP AROUND READ METHOD THEREOF

(71) Applicant: Winbond Electronics Corp., Taichung (TW)

(72) Inventor: Chung-Zen Chen, Taichung (TW)

(73) Assignee: Windbond Electronics Corp., Taichung (TW)

( * ) Notice: Subject to any disclaimer, the term of this patent is extended or adjusted under 35 U.S.C. 154(b) by 190 days.

(21) Appl. No.: 18/410,985

(22) Filed: Jan. 11, 2024

(65) Prior Publication Data

US 2024/0265954 A1  Aug. 8, 2024

(30) Foreign Application Priority Data

Feb. 4, 2023  (TW) ................. 112103983

(51) Int. Cl.
*G11C 7/08* (2006.01)
*G11C 7/10* (2006.01)

(52) U.S. Cl.
CPC ............. *G11C 7/1069* (2013.01); *G11C 7/08* (2013.01); *G11C 7/1063* (2013.01)

(58) Field of Classification Search
CPC ....... G11C 7/1069; G11C 7/08; G11C 7/1063; G11C 11/5642; G11C 7/222; G11C 7/106; G11C 7/1066; G11C 16/0483; G11C 16/08; G11C 16/10; G11C 16/24; G11C 7/1039; G11C 16/26; G11C 16/32
USPC .................................................... 365/230.06
See application file for complete search history.

(56) References Cited

U.S. PATENT DOCUMENTS

| | | | |
|---|---|---|---|
| 5,574,880 A | 11/1996 | Shaw | |
| 9,548,089 B2 | 1/2017 | Liles et al. | |
| 2012/0230106 A1* | 9/2012 | Yano | G11C 11/5642 365/185.11 |
| 2013/0080826 A1* | 3/2013 | Kondo | G11C 29/824 714/E11.085 |
| 2013/0188431 A1* | 7/2013 | Scheuerlein | G11C 13/0011 365/189.011 |
| 2018/0315466 A1* | 11/2018 | Derner | G11C 11/40615 |

FOREIGN PATENT DOCUMENTS

TW  I635506  9/2018

* cited by examiner

*Primary Examiner* — Amir Zarabian
*Assistant Examiner* — Minh Dinh
(74) *Attorney, Agent, or Firm* — JCIPRNET

(57) ABSTRACT

A memory device including a memory cell array, a signal generator, a word line decoder, a bit line decoder, a sensing amplifier circuit and a register circuit is provided. The signal generator generates a control signal according to a wrap around read command. The word line decoder, the bit line decoder, and the sensing amplifier circuit read data stored in the memory cell array according to the wrap around read command, so as to output a first wrap around read data. The register circuit is configured to latch the first wrap around read data and outputs successive wrap around read data according to the control signal and the latched first wrap around read data after the first wrap around read data is output. When the register circuit outputs the successive wrap around read data, the word line decoder, the bit line decoder, and the sensing amplifier circuit are disable.

18 Claims, 6 Drawing Sheets

MEMORY DEVICE AND WRAP AROUND READ METHOD THEREOF

CROSS-REFERENCE TO RELATED APPLICATION

This application claims the priority benefit of Taiwan application Ser. No. 112103983, filed on Feb. 4, 2023. The entirety of the above-mentioned patent application is hereby incorporated by reference herein and made a part of this specification.

BACKGROUND

Technical Field

The disclosure relates to a memory device and a read method thereof, and in particular relates to a memory device with wrap around read function and a read method thereof.

Description of Related Art

When the wrap around read function of a flash memory is enabled, data reading can be limited to a unit byte of a page. The wrap around read feature allows multiple applications using the cache to quickly fetch critical addresses and then load the fixed-length data into the cache without issuing multiple read commands. Specifically, start reading from the start address specified by the wrap around read command, once the end address of the unit byte is reached, the output of the data will automatically wrap around the start address for reading until the chip select signal CS#pulled high to terminate the wrap around read command. However, during the wrap around read operation of the conventional flash memory, the word line and the bit switch need to remain conductive, and the sensing amplifier is continuously operating, such that the power consumption of the flash memory is quite high during the wrap around read operation.

SUMMARY

The disclosure provides a memory device and a wrap around read method thereof, which can reduce the power consumption during the wrap around read operation.

The memory device of the disclosure includes a memory cell array, a signal generator, a word line decoder, a bit line decoder, a sensing amplifier circuit, and a register circuit. The memory cell array is configured to store data. The signal generator is configured to generate a control signal according to a wrap around read command. The word line decoder is coupled to the memory cell array and configured to receive the control signal. The bit line decoder is coupled to the memory cell array and configured to receive the control signal. The sensing amplifier circuit is coupled to the bit line decoder and configured to receive the control signal. The register circuit is coupled to the sensing amplifier circuit and configured to receive the control signal. The word line decoder, the bit line decoder, and the sensing amplifier circuit are configured to perform a first read to data stored in the memory cell array according to the wrap around read command, so as to output first wrap around read data. The register circuit is configured to latch the first wrap around read data, and output successive wrap around read data according to the control signal and the latched first wrap around read data after the first wrap around read data is output. When the register circuit outputs successive wrap around read data, the word line decoder, the bit line decoder, and the sensing amplifier circuit are disabled according to the control signal.

The wrap around read method of the memory device of the disclosure includes the following operation. A word line decoder, a bit line decoder, and a sensing amplifier circuit perform a first read to data stored in a memory cell array according to a wrap around read command, so as to output a first wrap around read data. A control signal is generated according to the wrap around read command. The register circuit latches the first wrap around read data. The register circuit outputs successive wrap around read data according to the control signal and the latched first wrap around read data after the first wrap around read data is output. When the register circuit outputs successive wrap around read data, the word line decoder, the bit line decoder, and the sensing amplifier circuit are disabled according to the control signal.

DETAILED DESCRIPTION OF DISCLOSED EMBODIMENTS

Figure 1:
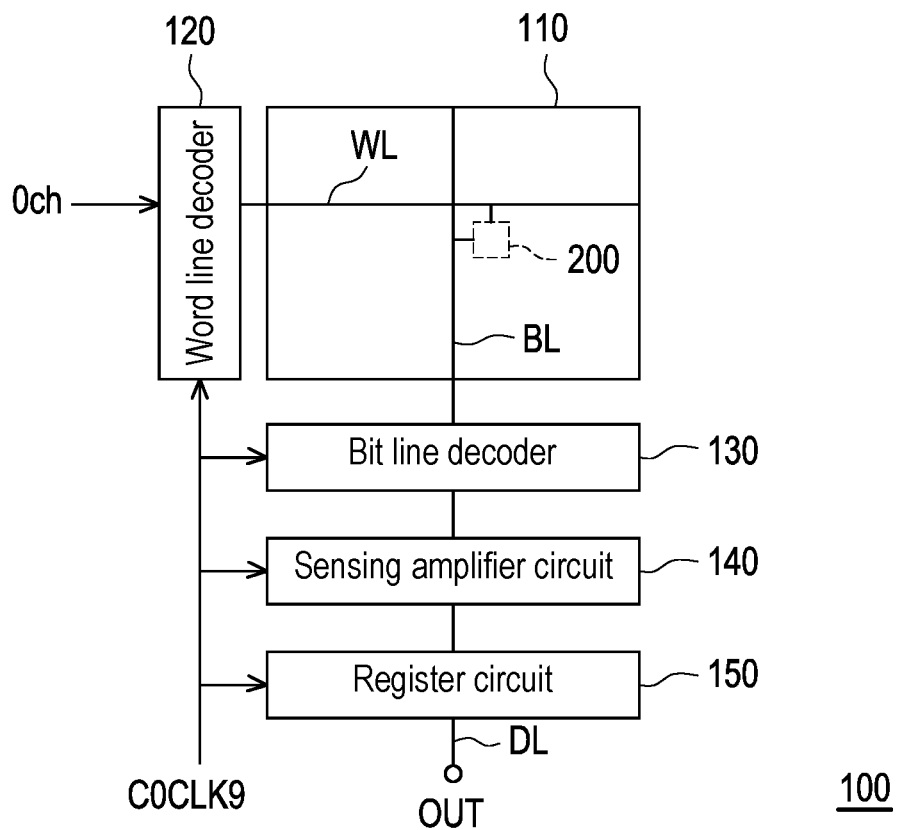
FIG. 1 is a schematic diagram of a memory device according to an embodiment of the disclosure.
Figure 2:
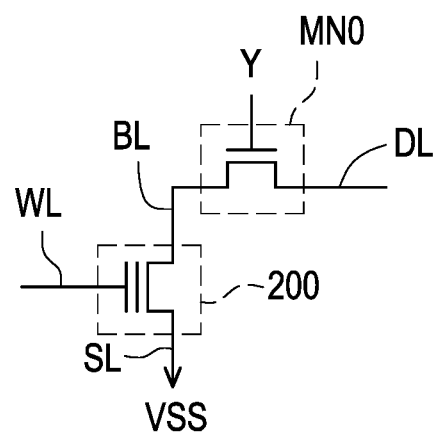
FIG. 2 is a circuit schematic diagram of a memory cell and a bit switch in the embodiment of FIG. 1.

Referring to FIG. 1 and FIG. 2, the memory device 100 includes a memory cell array 110, a word line decoder 120, a bit line decoder 130, a sensing amplifier circuit 140, and a register circuit 150. The memory cell array 110 includes multiple memory cells 200 for storing data. For clarity, FIG. 1 only shows a memory cell 200 as an example, and the memory device 100 is, for example, a NOR flash memory, but the disclosure is not limited thereto. The memory device 100 can be any kind of semiconductor memory capable of performing wrap around read operations.

The word line decoder 120 is coupled to the memory cell 200 through a word line WL. The memory cell 200 is coupled to the bit switch MN0 through the bit line BL. The bit line BL is coupled to a sensing amplifier circuit 140 through the bit switch MN0. When the bit switch MN0 is turned on (conductive), the bit line BL provides the data stored in the memory cell 200 to the sensing amplifier circuit 140. The source line SL of the memory cell 200 is coupled to the system low voltage VSS. The register circuit 150 is coupled to the sensing amplifier circuit 140.

In this embodiment, the word line decoder 120, the bit line decoder 130, and the sensing amplifier circuit 140 are activated according to the wrap around read command 0Ch, so that the data stored in the specified unit byte of the memory cell array 110 (hereinafter referred to as the wrap around read data) is read for the first time, and the first wrap around read data is output. The register circuit 150 is configured to latch the first wrap around read data. Specifically, after the first read of the wrap around read data is completed, the control signal C0CLK9 is switched to a first level (e.g., a high level) to disable the word line decoder 120, the bit line decoder 130, and the sensing amplifier circuit 140. The register circuit 150 is configured to output successive wrap around read data according to the control signal C0CLK9 of the first level and the latched first wrap around read data until the wrap around read command is terminated.

Specifically, the wrap around read operation is started on the memory cell 200 according to the wrap around read command 0Ch. During the first read of the wrap around read operation, the word line decoder 120 turns on the memory cell 200 through the word line WL to select the memory cell 200. Next, the bit line decoder 130 uses the address signal Y to turn on the bit switch MN0. When the bit switch MN0 is turned on, the bit line BL provides the data stored in the selected memory cell 200 to the sensing amplifier circuit 140. Afterwards, the sensing amplifier circuit 140 performs a sensing operation and outputs the first wrap around read data to the data line DL and the register circuit 150. The register circuit 150 is configured to receive and latch the first wrap around read data. After the first read of the wrap around read data is completed (i.e., after the first wrap around read data is output to the output terminal OUT through the data line DL), the control signal C0CLK9 is switched to the first level (for example, a high level) to disable the word line decoder 120, the bit line decoder 130, and the sensing amplifier circuit 140. The register circuit 150 is configured to repeatedly output successive wrap around read data according to the control signal C0CLK9 of the first level and the latched first wrap around read data until the chip select signal CS# is pulled high to terminate the wrap around read command.

In this embodiment, when the wrap around read operation ends, the control signal C0CLK9 is switched back to the second level (e.g., a low level).

In this embodiment, the word line decoder 120, the bit line decoder 130, and the sensing amplifier circuit 140 can be designed and implemented as hardware circuits based on circuit design methods known to those skilled in the art. Different from the conventional hardware circuits, the word line decoder 120, the bit line decoder 130, and the sensing amplifier circuit 140 of this embodiment have a disabling circuit configured to receive the control signal C0CLK9. The disabling circuit is, for example, a transistor switch, which is configured to disable the word line decoder 120, the bit line decoder 130, and the sensing amplifier circuit 140 according to the control signal C0CLK9 of the first level, so as to reduce power consumption during wrap around read operations.

In other words, in this embodiment, in the wrap around read operation, only the first wrap around read data is output from the sensing amplifier circuit 140, and successive wrap around read data are output from the register circuit 150. In this way, the word line decoder 120, the bit line decoder 130, and the sensing amplifier circuit 140 can be disabled during most of the wrap around read operation to reduce power consumption during the wrap around read operation.

Figure 3:
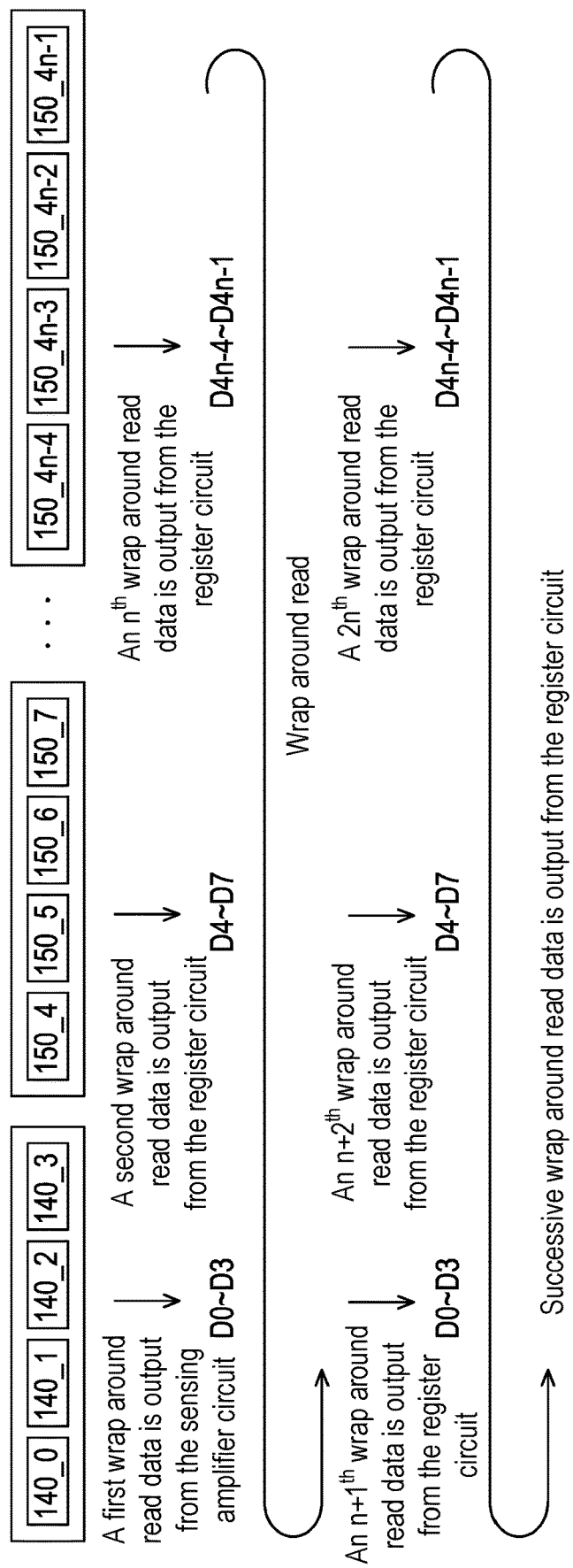
FIG. 3 is a schematic diagram of a wrap around read operation according to an embodiment of the disclosure.

Please further refer to FIG. 2 and FIG. 3, in FIG. 3, 4 data are simultaneously output at a time with a fixed length n, and 4n data are output in a wrap around manner as an example for illustration, but the disclosure is not limited thereto. In this embodiment, in the wrap around read operation, only the first wrap around read data (e.g., data D0 to data D3, that is, the data corresponding to the start address) is output from the sensing amplifier circuits 140_0, 140_1, 140_2 and 140_3, and the successive wrap around read data (e.g., data D4 to data Dn−1) is output from the register circuit. For example, the second wrap around read data (e.g., data D4 to data D7) is output from the register circuits 150_4, 150_5, 150_6 and 150_7, and the $n^{th}$ wrap around read data (e.g., data D4n-4 to data D4n-1) are output from the register circuits 150_4n-4, 150_4n-3, 150_4n-2 and 150_4n-1. Then, the start address is automatically wrapped around, so that the data D0 to D3 that have been latched in the register circuit serve as the n+1$^{th}$ wrap around read data, and are output from the register circuits correspondingly coupled to the sensing amplifier circuits 140_0, 140_1, 140_2 and 140_3. Then the n+2$^{th}$ wrap around read data (i.e., the latched data D4 to data D7) are output from the register circuits 150_4, 150_5, 150_6, and 150_7, and so on, then the 2nth wrap around read data (i.e., the latched data D4n-4 to data D4n-1) are output from the register circuits 150_4n-4, 150_4n-3, 150_4n-2 and 150_4n-1, and so on, to complete the wrap around read operation, where n is a positive integer greater than 2. Therefore, the word line decoder 120, the bit line decoder 130, and the sensing amplifier circuit 140 can be disabled during most of the wrap around read operation to reduce power consumption during the wrap around read operation.

Figure 4:
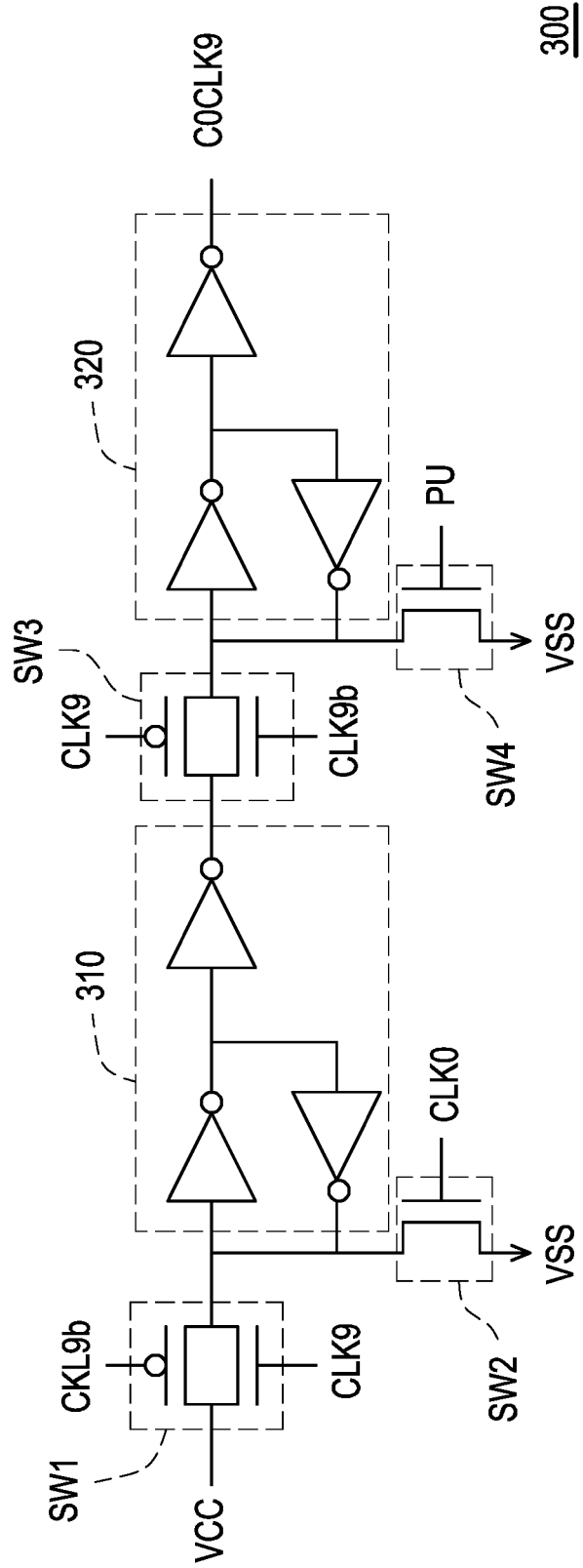
FIG. 4 is a schematic diagram of a signal generator according to an embodiment of the disclosure.
Figure 5:
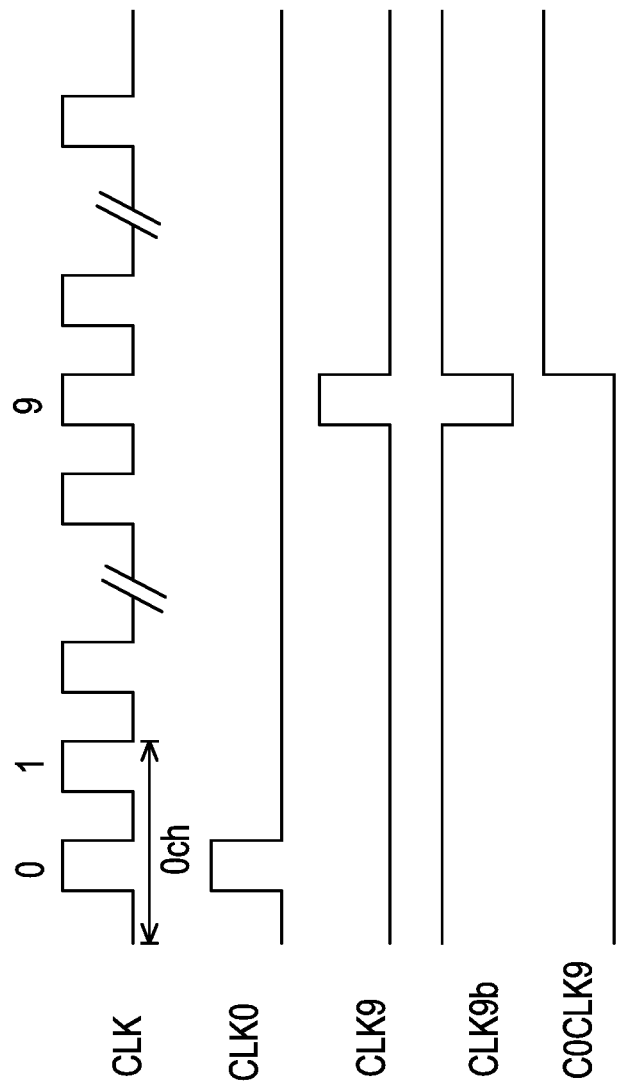
FIG. 5 is a schematic diagram of waveforms of the operating signal of the signal generator in the embodiment of FIG. 4.

Referring to FIG. 4 and FIG. 5, the memory device 100 may further include a signal generator 300, which generates and outputs the control signal C0CLK9 to the word line decoder 120, the bit line decoder 130, the sensing amplifier circuit 140, and the register circuit 150 according to the wrap around read command 0Ch, the clock signal CLK, and the register circuit initial state setting signal PU, in order to control the word line decoder 120, the bit line decoder 130, the sensing amplifier circuit 140, and the register circuit 150 to perform the wrap around read operation to the memory cell array 110. The register circuit initial state setting signal PU is configured to set an initial state of the register circuit after power-on.

In FIG. 4, the signal generator 300 includes a first switch SW1, a second switch SW2, a first latch circuit 310, a third switch SW3, a fourth switch SW4, and a second latch circuit 320. The first terminal of the first switch SW1 is coupled to the first voltage VDD, the second terminal of the first switch SW1 is coupled to the first terminal of the second switch SW2 and the first terminal of the first latch circuit 310, and the control terminal of the first switch SW1 is coupled to the first clock CLK9. The first terminal of the second switch SW2 is coupled to the second terminal of the first switch SW1 and the first terminal of the first latch circuit 310, the second terminal of the second switch SW2 is coupled to the second voltage VSS, and the control terminal of the second switch SW2 is coupled to the second clock CLK0. A second terminal of the first latch circuit 310 is coupled to a first terminal of the third switch SW3.

The second terminal of the third switch SW3 is coupled to the first terminal of the fourth switch SW4 and the first terminal of the second latch circuit 320, and the control terminal of the third switch SW3 is coupled to the inverted signal CLK9b of the first clock CLK9. The first terminal of the fourth switch SW4 is coupled to the second terminal of the third switch SW3 and the first terminal of the second latch circuit 320, the second terminal of the fourth switch SW4 is coupled to the second voltage VSS, and the control terminal of the fourth switch is coupled to the register circuit initial state setting signal PU. The second terminal of the second latch circuit 320 serves as the output terminal of the signal generator 300. The control signal C0CLK9 is output from the output terminal of the signal generator 300.

Specifically, the first two clock pulses of the clock signal CLK (marked as 0 and 1 in FIG. 5) correspond to the first read period of the wrap around read command 0Ch. The word line decoder 120, the bit line decoder 130, and the sensing amplifier circuit 140 reads the first wrap around read data of the wrap around read operation on the memory cell 200 during the first read period according to the wrap around read command 0Ch. At this time, the signal generator 300 outputs the second voltage VSS according to the high level of the second clock CLK0, the high level of the inverted signal CLK9*b* of the first clock, and the low level of the first clock CLK9, so that the control signal C0CLK9 remains at low level. Therefore, the signal generator 300 outputs the control signal C0CLK9 at a low level.

In FIG. 4, during the first read period, the first clock CLK9 turns off the first switch SW1, and the inverted signal CLK9*b* of the first clock turns on the third switch SW3. That is to say, the first switch SW1 and the third switch SW3 are not turned on at the same time. At the same time, the second clock CLK0 turns on the second switch SW2, so that the second voltage VSS is transmitted to the output terminal of the signal generator 300 through the second switch SW2, the first latch circuit 310, the third switch SW3, and the second latch circuit 320, to generate a control signal C0CLK9 at a low level.

Then, the first clock CLK9 and the inverted signal CLK9*b* of the first clock are respectively switched to a high level and a low level at the ninth clock of the clock signal CLK (marked as 9 in FIG. 5). The signal generator 300 outputs the first voltage VCC according to the low level of the second clock CLK0, the low level of the inverted signal CLK9*b* of the first clock, and the high level of the first clock CLK9, so that the control signal C0CLK9 changes to remain at high level. Therefore, the signal generator 300 outputs the control signal C0CLK9 at a high level. When the word line decoder 120, the bit line decoder 130, and the sensing amplifier circuit 140 receive the control signal C0CLK9 with a high level (the first level), they are disabled, and when the register circuit 150 receives the control signal C0CLK9 having the first level, the successive wrap around read data is output.

In FIG. 4, during the period when the register circuit 150 outputs successive wrap around read data, the first clock CLK9 turns on the first switch SW1, and the inverted signal CLK9*b* of the first clock turns off the third switch SW3, so that after the first voltage VCC passes through the first switch SW1, it is latched to the first latch circuit 310. Next, the first clock CLK9 turns off the first switch SW1, and the inverted signal CLK9*b* of the first clock turns on the third switch SW3, so that the first voltage VSS is transmitted to the output terminal of the signal generator 300 through the third switch SW2 and the second latch circuit 320, to generate a control signal C0CLK9 at the first level. In addition, when the register circuit 150 outputs successive wrap around read data, the second clock CLK0 turns off the second switch SW2, and the register circuit initial state setting signal PU turns off the fourth switch SW4.

On the other hand, the register circuit initial state setting signal PU is configured to set the initial state of the signal generator 300 after power-on, and set the initial state of the control signal C0CLK9 to the second level.

In this embodiment, the first two clock pulses of the clock signal CLK correspond to the first read period of the wrap around read command 0Ch, which is only used for illustration and not to limit the disclosure. The first clock CLK9 and the inverted signal CLK9*b* of the first clock are respectively switched to a high level and a low level at the ninth clock of the clock signal CLK, which are only used for illustration and not to limit the disclosure.

Figure 6:
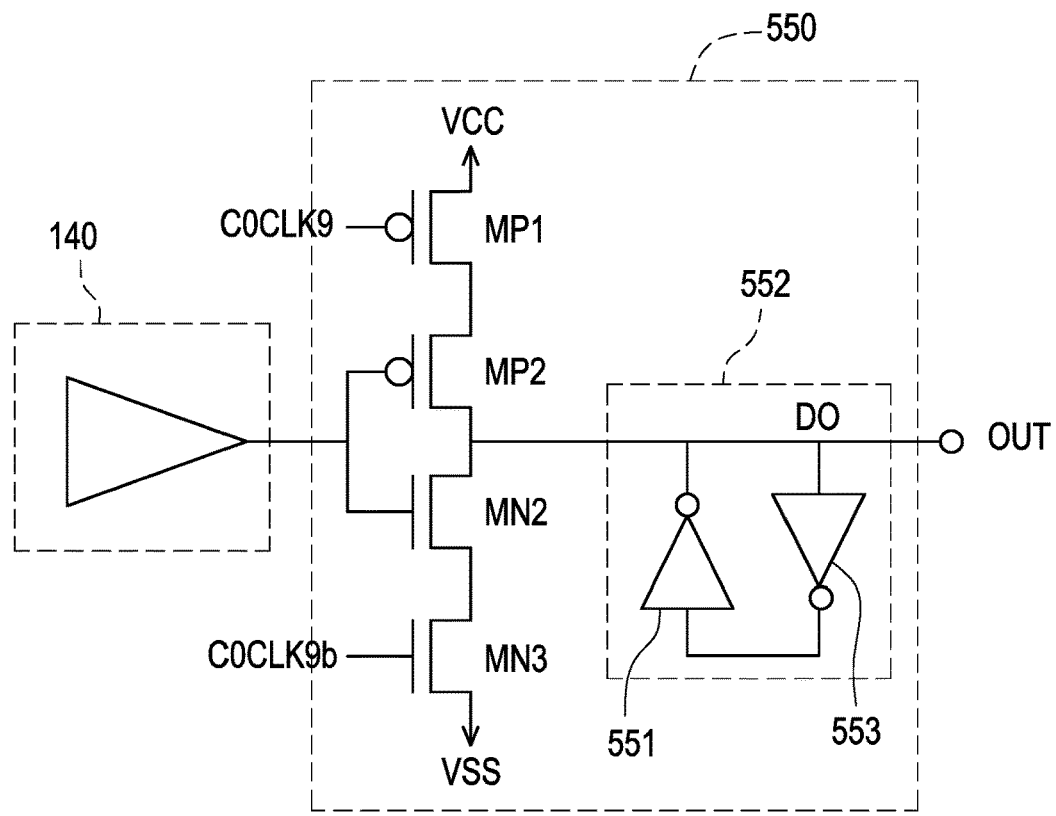
FIG. 6 is a circuit schematic diagram of a register circuit according to an embodiment of the disclosure.

Referring to FIG. 6, the register circuit 550 according to an embodiment of the disclosure includes a first transistor MP1, a second transistor MP2, a third transistor MN2, and a fourth transistor MN3, which are sequentially connected between the system high voltage VCC (the first voltage) and the system low voltage VSS (the second voltage). The first transistor MP1 is controlled by the control signal C0CLK9. The second transistor MP2 and the third transistor MN2 are jointly controlled by the sensing data output by the sensing amplifier circuit 140. The fourth transistor MN3 is controlled by the inverted signal C0CLK9*b* of the control signal C0CLK9. The first inverter 551 and the second inverter 553 form a latch 552 configured to latch the first wrap around read data DO.

In this embodiment, the control signal C0CLK9 with a high level controls the register circuit 550 to output the latched first wrap around read data to the output terminal OUT, and the control signal C0CLK9 with a high level controls the word line decoder 120, the bit line decoder 130, and the sensing amplifier circuit 140 to stop the read operation on the memory cell array 110, so as to reduce power consumption of the memory device 100.

Figure 7:
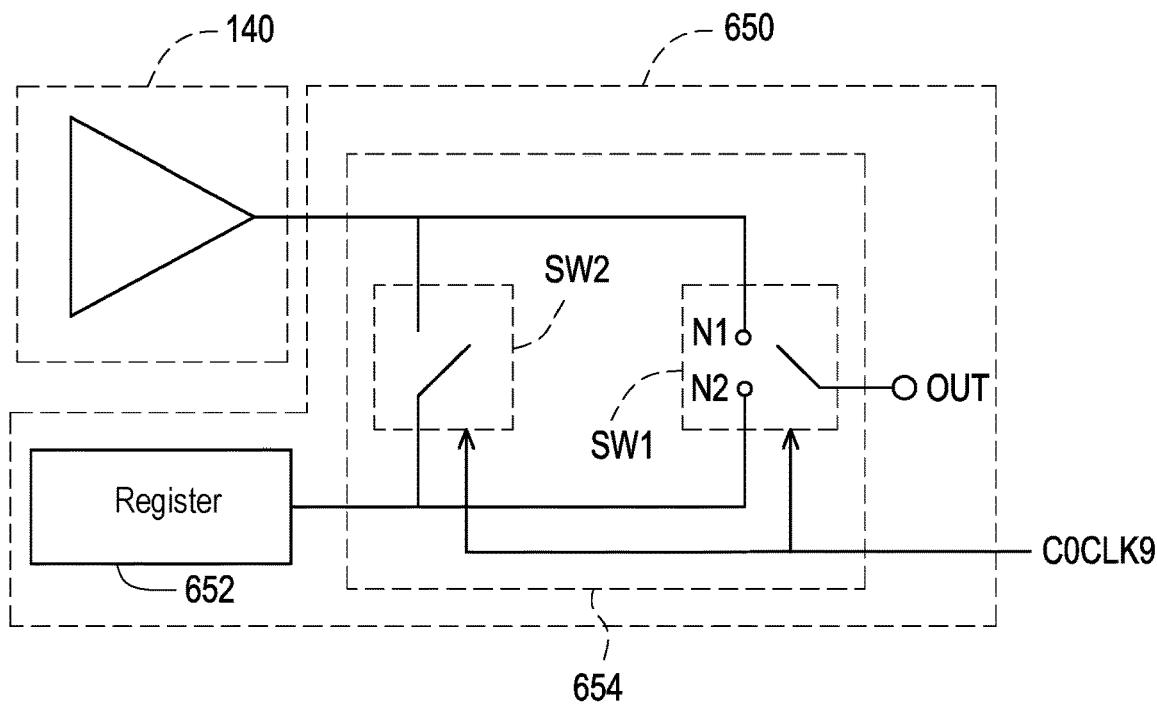
FIG. 7 is a circuit schematic diagram of a register circuit according to another embodiment of the disclosure.

Referring to FIG. 7, a register circuit 650 according to another embodiment of the disclosure includes a register 652, a switch circuit 654, and an output terminal OUT. The sensing amplifier circuit 140 is coupled to the register 652 and the output terminal OUT through the switch circuit 654. The switch circuit 654 includes a first switch SW1 and a second switch SW2. In this embodiment, the register 652 may be a hardware circuit designed and implemented by a circuit design method known to those skilled in the art.

The control signal C0CLK9 with a high level controls the first switch SW1 to couple the terminal N2 to the output terminal OUT, and the control signal C0CLK9 with a low level controls the first switch SW1 to couple the terminal N1 to the output terminal OUT. The control signal C0CLK9 with a high level controls the second switch SW2 to be non-conductive, and the control signal C0CLK9 with a low level controls the second switch SW2 to be conductive. Therefore, the control signal C0CLK9 with a low level controls the switch circuit 654, so that the sensing amplifier circuit 140 is connected to the register 652 and the output terminal OUT, so that the sensing amplifier circuit 140 can latch the first wrap around read data DO in the register 652 and output it to the output terminal OUT. Afterwards, the control signal C0CLK9 with a high level controls the switch circuit 654 so that the sensing amplifier circuit 140 is not connected to the register 652 and the output terminal OUT. At this time, the register 652 can output the successive wrap around read data to the output terminal OUT through the terminal N2 according to the first wrap around read data DO and the control signal C0CLK9 with a high level. In addition, the control signal C0CLK9 with a high level controls the word line decoder 120, the bit line decoder 130, and the sensing amplifier circuit 140 to stop the read operation on the memory cell array 110, so as to reduce the power consumption of the memory device 100.

Figure 8:
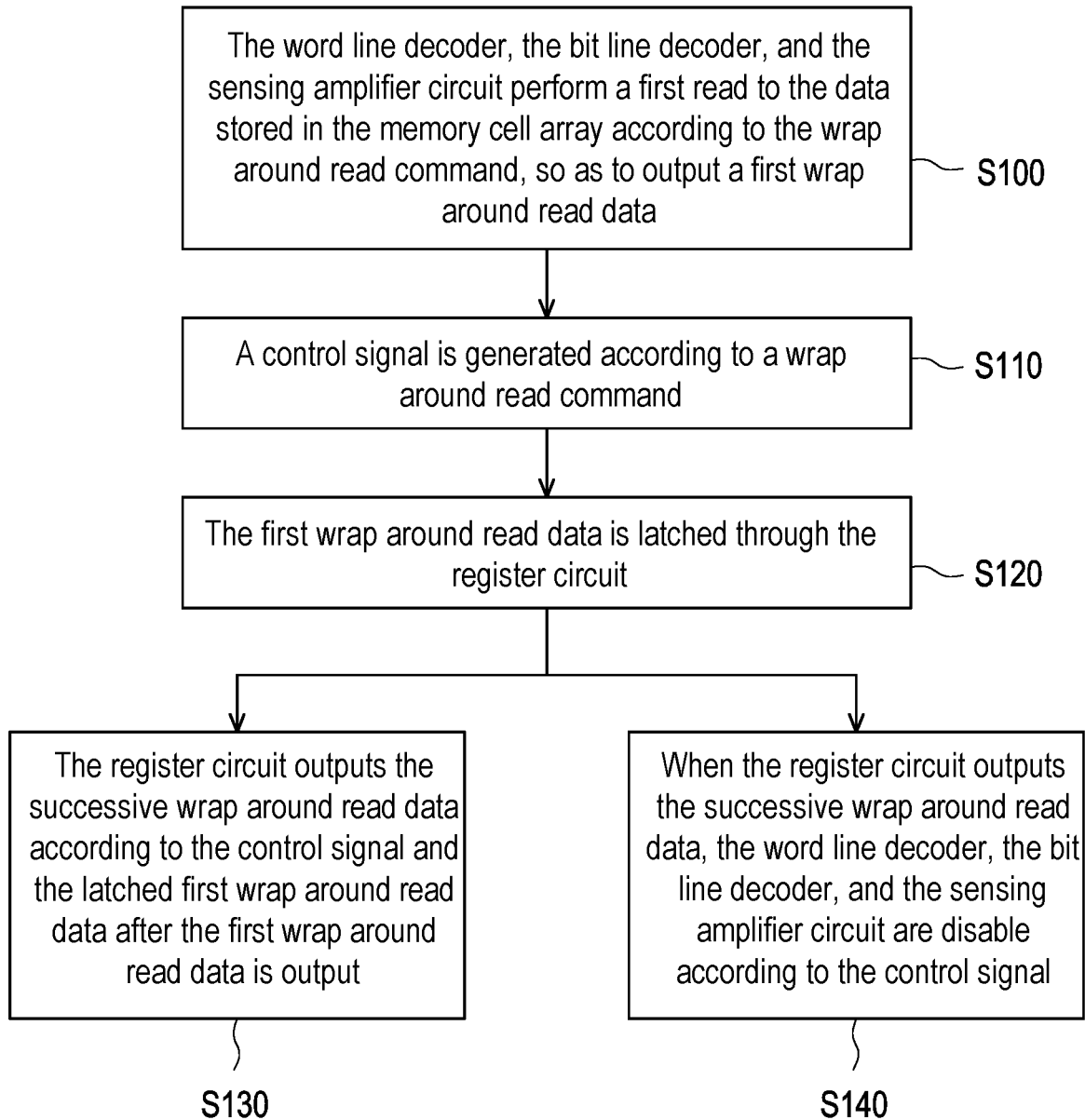
FIG. 8 is a flowchart of the steps of the wrap around read method according to an embodiment of the disclosure.

Referring to FIG. 1 and FIG. 8, the wrap around read method of this embodiment is at least applicable to the memory device 100 in FIG. 1, but the disclosure is not limited thereto. As shown in FIG. 8, in step S100, the word line decoder, the bit line decoder, and the sensing amplifier circuit perform a first read to data stored in the memory cell array according to the wrap around read command, to output the first wrap around read data from the sensing amplifier circuit. In one embodiment, the first read is configured to output data corresponding to the start address. In step S110, a control signal is generated according to the wrap around read command. In step S120, the first wrap around read data is latched by the register circuit. Specifically, the register circuit is used to latch the first wrap around read data and the successive wrap around read data. In step S130, after the first wrap around read data is output, the register circuit outputs successive wrap around read data according to the control signal and the latched first wrap around read data. In step S140, the word line decoder, the bit line decoder, and the sensing amplifier circuit are disabled according to the control signal during the period when the register circuit is outputting successive wrap around read data.

In addition, the description of the embodiment of FIG. 2 to FIG. 7 can provide sufficient teaching, suggestion and implementation directions for the wrap around read method of the memory device of the embodiment of the disclosure.

Furthermore, the memory devices of the present disclosure may be used on automotive electronics, such as Advanced Driver Assistance Systems (ADAS), Instrument Clusters, Infotainment in an electric vehicle. The memory devices of the present disclosure may be used on space constrained applications including Wearable, MP3 players, smart watches, games, digital radio, toys, cameras, digital photo album, GPS, Bluetooth and WiFi modules. The memory devices of the present disclosure may be used on IoT and mobile electronic devices.

To sum up, in the embodiment of the disclosure, by using the control signal generated according to the wrap around read command, the word line decoder, the bit line decoder, and the sensing amplifier circuit are disabled during the period when the register circuit is outputting the successive wrap around read data. Therefore, the present disclosure provides a green technology by reducing power consumption when performing the wrap around read operation in a memory device.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A memory device, comprising:
a memory cell array, configured to store data;
a signal generator, configured to generate a control signal according to a wrap around read command;
a word line decoder, coupled to the memory cell array and configured to receive the control signal;
a bit line decoder, coupled to the memory cell array and configured to receive the control signal;
a sensing amplifier circuit, coupled to the bit line decoder and configured to receive the control signal; and
a register circuit, coupled to the sensing amplifier circuit and configured to receive the control signal;
wherein, the word line decoder, the bit line decoder, and the sensing amplifier circuit are configured to perform a first read to the data stored in the memory cell array according to the wrap around read command to output first wrap around read data,
wherein, the register circuit is configured to latch the first wrap around read data, and output successive wrap around read data according to the control signal and the first wrap around read data that is latched after the first wrap around read data is output,
wherein, during a period when the register circuit outputs the successive wrap around read data, the word line decoder, the bit line decoder, and the sensing amplifier circuit are disabled according to the control signal.

2. The memory device according to claim 1, wherein the signal generator generates and outputs the control signal according to a clock signal, the wrap around read command, and a register circuit initial state setting signal.

3. The memory device according to claim 2, wherein the register circuit initial state setting signal is configured to set an initial state of the register circuit after power-on.

4. The memory device according to claim 2,
wherein, the signal generator generates the control signal of a second level during the first read, so that the sensing amplifier circuit provides the first wrap around read data to the register circuit and an output terminal,
wherein, the signal generator generates the control signal of a first level during the period when the register circuit outputs the successive wrap around read data, so that the word line decoder, the bit line decoder, and the sensing amplifier circuit are disabled according to the control signal at the first level.

5. The memory device according to claim 4, wherein the signal generator comprises:
a first switch, having a first terminal, a second terminal, and a control terminal, wherein the first terminal of the first switch is coupled to a first voltage, and the control terminal of the first switch is coupled to a first clock;
a second switch, having a first terminal, a second terminal, and a control terminal, wherein the first terminal of the second switch is coupled to the second terminal of the first switch, the second terminal of the second switch is coupled to a second voltage, and the control terminal of the second switch is coupled to a second clock;
a first latch circuit, having a first terminal and a second terminal, wherein the first terminal of the first latch circuit is coupled to the second terminal of the first switch and the first terminal of the second switch;
a third switch, having a first terminal, a second terminal, and a control terminal, wherein the first terminal of the third switch is coupled to the second terminal of the first latch circuit, and the control terminal of the third switch is coupled to an inverted signal of the first clock;
a fourth switch, having a first terminal, a second terminal, and a control terminal, wherein the first terminal of the fourth switch is coupled to the second terminal of the third switch, the second terminal of the fourth switch is coupled to the second voltage, and the control terminal of the fourth switch is coupled to the register circuit initial state setting signal; and
a second latch circuit, having a first terminal and a second terminal, wherein the first terminal of the second latch circuit is coupled to the second terminal of the third switch and the first terminal of the fourth switch, and the second terminal of the second latch circuit serves as an output terminal of the signal generator, wherein the control signal is output from the output terminal of the signal generator.

6. The memory device according to claim 5, wherein the first switch and the third switch are not turned on at a same time.

7. The memory device according to claim 5, wherein the first clock turns off the first switch, the inverted signal of the first clock turns on the third switch, and the second clock turns on the second switch, so that the second voltage is transmitted to the output terminal of the signal generator through the second switch, the first latch circuit, the third switch, and the second latch circuit to generate the control signal of the second level.

8. The memory device according to claim 5, wherein during the period when the register circuit outputs the successive wrap around read data, the first clock turns on the first switch, and the inverted signal of the first clock turns off the third switch, so that after the first voltage passes through the first switch, the first voltage is latched in the first latch circuit, next, the first clock turns off the first switch, and the inverted signal of the first clock turns on the third switch, so that the first voltage passes through the third switch and the second latch circuit and is transmitted to the output terminal of the signal generator to generate the control signal of the first level.

9. The memory device according to claim 8, wherein the second clock turns off the second switch, and the register circuit initial state setting signal turns off the fourth switch during the period when the register circuit outputs the successive wrap around read data.

10. The memory device according to claim 1, wherein the register circuit comprises:
   a first transistor, a second transistor, a third transistor, and a fourth transistor, sequentially connected in series between a first voltage and a second voltage; and
   a first inverter and a second inverter, forming a latch, coupled to the second transistor and the third transistor, wherein the latch is configured to latch sensing data output by the sensing amplifier circuit.

11. The memory device according to claim 10, wherein the first transistor is controlled by the control signal, the second transistor and the third transistor are jointly controlled by the sensing data output by the sensing amplifier circuit, and the fourth transistor is controlled by an inverted signal of the control signal.

12. The memory device according to claim 1, wherein the register circuit comprises a register, a switch circuit, and an output terminal, and the sensing amplifier circuit is coupled to the register and the output terminal through the switch circuit.

13. The memory device according to claim 1, wherein the control signal having a first level controls a switch circuit so that the sensing amplifier circuit is not connected to the register circuit and an output terminal; and the control signal having a second level controls the switch circuit so that the sensing amplifier circuit is connected to the register circuit and the output terminal.

14. A wrap around read method of a memory device, wherein the memory device comprises a memory cell array, a word line decoder, a bit line decoder, a sensing amplifier circuit, and a register circuit, the wrap around read method comprises:
   performing a first read to data stored in the memory cell array by using the word line decoder, the bit line decoder, and the sensing amplifier circuit according to a wrap around read command to output first wrap around read data;
   generating a control signal according to the wrap around read command;
   latching the first wrap around read data by using the register circuit;
   outputting successive wrap around read data by using the register circuit according to the control signal and the first wrap around read data that is latched after the first wrap around read data is output; and
   disabling the word line decoder, the bit line decoder, and the sensing amplifier circuit according to the control signal during a period when the register circuit outputs the successive wrap around read data.

15. The wrap around read method of the memory device according to claim 14, further comprising:
   generating and outputting the control signal according to a clock signal, the wrap around read command, and a register circuit initial state setting signal.

16. The wrap around read method of the memory device according to claim 15, wherein the register circuit initial state setting signal sets an initial state of the register circuit after power-on.

17. The wrap around read method of the memory device according to claim 15, wherein the control signal of a second level is generated during the first read, so that the sensing amplifier circuit provides the first wrap around read data to the register circuit and an output terminal.

18. The wrap around read method of the memory device according to claim 15, wherein, the control signal of a first level is generated during the period when the register circuit outputs the successive wrap around read data, so that the word line decoder, the bit line decoder, and the sensing amplifier circuit are disabled according to the control signal at the first level.

* * * * *